Jan. 31, 1967   R. S. JONES ETAL   3,301,342
FLEXIBLE SKIRTS FOR GROUND EFFECT VEHICLES
Filed Feb. 24, 1964   2 Sheets-Sheet 1

INVENTORS
RICHARD S. JONES
ALEXANDER W. PRICKETT

BY *Larson and Taylor*

ATTORNEYS

Jan. 31, 1967  R. S. JONES ETAL  3,301,342
FLEXIBLE SKIRTS FOR GROUND EFFECT VEHICLES
Filed Feb. 24, 1964  2 Sheets-Sheet 2
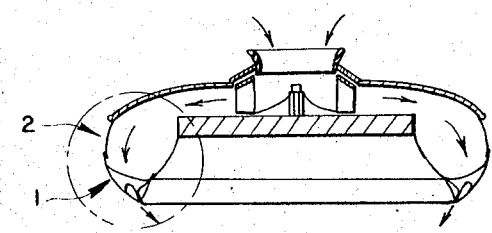
FIG. 3
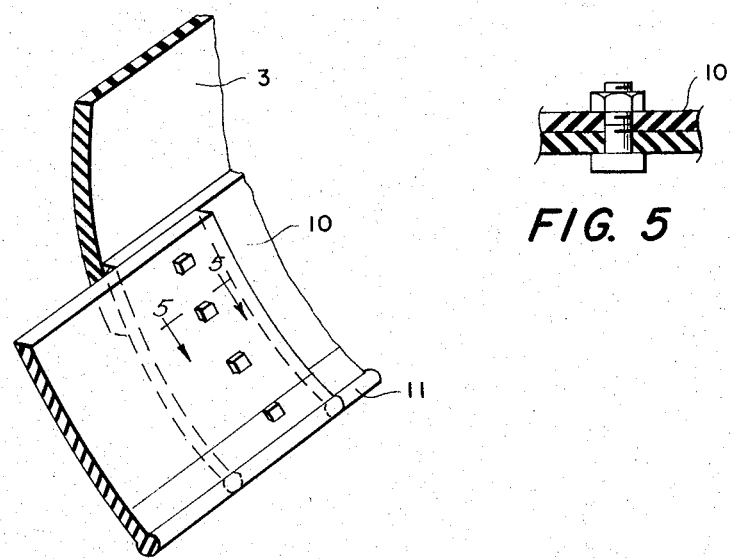
FIG. 4
FIG. 5
INVENTORS
RICHARD S. JONES
ALEXANDER W. PRICKETT
BY *Larson and Taylor*
ATTORNEYS United States Patent Office 3,301,342
Patented Jan. 31, 1967

3,301,342
FLEXIBLE SKIRTS FOR GROUND
EFFECT VEHICLES
Richard S. Jones and Alexander W. Prickett, Yeovil,
Somerset, England, assignors to Westland Aircraft Limited, Yeovil, Somerset, England
Filed Feb. 24, 1964, Ser. No. 346,971
Claims priority, application Great Britain, Mar. 14, 1963,
10,117/63
6 Claims. (Cl. 180—7)

This invention relates to flexible skirts for ground effect vehicles and could be applicable to any ground effect vehicle whatever jet concept it may use, for generating the pressurized ground effect air or gas cushion.

The desirablility of flexibly extending the lower portions of a ground effect vehicle especially the jet duct walls, in order to retard the escape of air from beneath the vehicle, has already become apparent.

Operational experience has shown that the lower portions of such flexible skirting are subjected to severe abrasive action when passing over and contacting the surface over which the vehicle is travelling, and it is desirable that such portions may be replaceable. Furthermore, it has been discovered that it is desirable to adjust the length of such flexible skirting according to operational conditions, and accordingly, interchangeable lower portions of different lengths are also desirable. This problem has partly been overcome by the devices described in copending U.S. application Serial No. 212,759 filed July 6, 1962, now Patent No. 3,244,248, which relate to various fastening means for releasably connecting detachable flexible skirts to the rigid base structure of a ground effect vehicle, or alternatively for releasably connecting such detachable flexible skirts and additional detachable flexible skirts. It is with convenient constructions of such additional detachable flexible skirts that this invention is particularly concerned.

Accordingly the invention consists in a ground effect vehicle provided with a flexible skirting assembly, the lower portion of which is fabricated to any required configuration, to any required length for releasable attachment to a flexible or rigid portion which forms a wall of said vehicle, any jet duct, or extension thereof.

Further objects and advantages of the invention will become apparent from the following detailed description with reference to the accompanying drawings, which are by way of example only, and wherein:

FIGURE 3 is a section through a ground effect vehicle provided with a flexible skirting assembly according to the present invention.

FIGURE 4 is a partial elevational view showing the attachment of the upper and lower skirt portions.

FIGURE 5 is a sectional view along the lines 5—5 of FIGURE 4.

Figure 1:
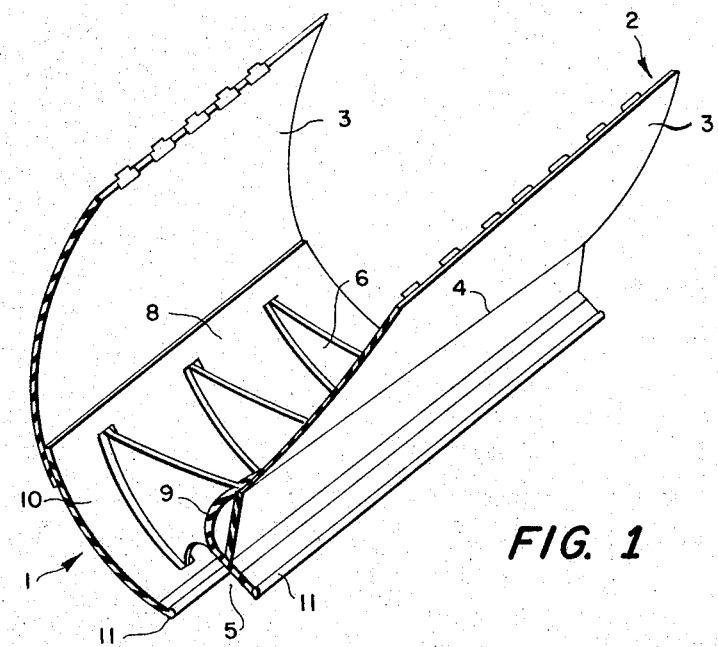
FIGURE 1 is an inboard view of a segment of the lower portion of a flexible skirting assembly according to the invention attached to part of an upper portion of the flexible skirting.
Figure 2:
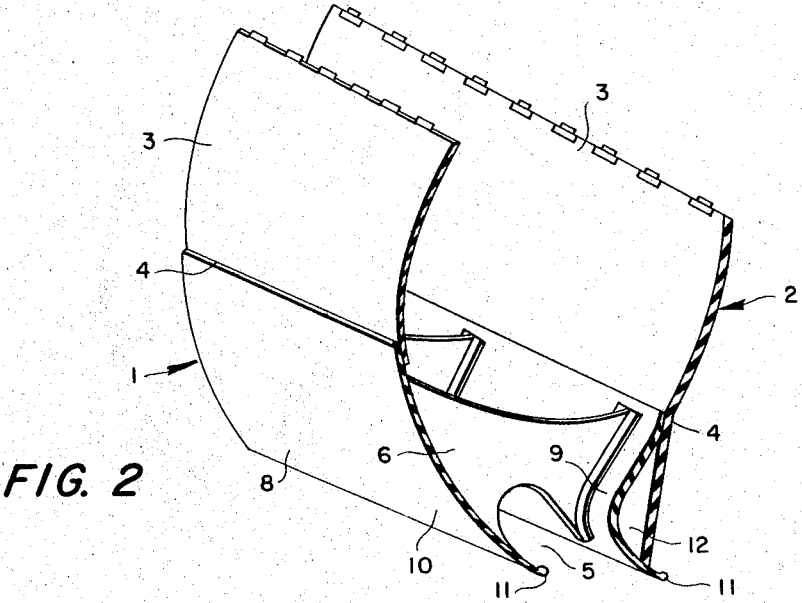
FIGURE 2 is an outboard view of FIGURE 1.

In carrying the invention into effect according to one convenient form, by way of example only, with reference to the accompanying drawings, the lower portion, generally indicated at 1, of a two part flexible skirting assembly generally indicated at 2 extending the peripheral jet duct of a ground effect vehicle is fabricated in segments which are attached at 4 to the upper portion 3 by one of the fastening means described in our copending U.S. application Serial No. 212,759 filed July 6, 1962, now Patent No. 3,244,248.

The air channel formed by the flexible skirting assembly 2 is funnel shaped in cross-section, tapering towards the bottom to form the flexible jet nozzle orifice 5, which is inwardly inclined to impart an inward component to the discharge of air from the orifice. The flexible skirting assembly 2 has a degree of inherent rigidity maintaining and biassing it to assume, or remain in the downwardly extended position.

The lower portion 1, which forms flexible jet nozzle orifice 5, and which may be subjected to severe abrasion during operation, is manufactured of moulded rubber and fabric with the rubber covering made thicker in those areas liable to be subjected to maximum abrasion. Diaphragms 6, which join the two opposing walls 7 and 8 of the lower portion 1, are bonded to the sides 7 and 8, and are of any desired pitch or shape. The upper portion 3 is made of a much lighter material in order to reduce the weight and the expense of manufacture. The walls 7 and 8 of each segment of the lower portion 1 are provided with overhanging flaps 9 and 10 extending the inner and outer walls 7 and 8 at each end of each segment. The overhanging flaps 9 and 10 are free from diaphragms 6, and are used to form a lap joint between adjacent segments forming the lower portion 1.

The lower edges of the walls 7 and 8, which are most likely to contact the ground, are provided with a hardwearing hem 11 of polyurethane rubber bonded to the lower edge of the wall.

Diaphragms 12 are provided in combination with the inner wall 7 on the inboard side of the wall 7, so that tension in the diaphragm 12 maintains the inward inclination of the flexible jet nozzle orifice 5.

It will be apparent to those skilled in the art that various refinements and modifications may be made to the embodiment hereinbefore particularly described with reference to the accompanying drawings, without departing from the scope of the invention.

The materials available which would be suitable for the purpose of carrying the invention into effect are many and varied, as are the methods of attachment, be it to an upper flexible portion 3, or to a rigid wall such as those employed in sidewall ground effect vehicles. For example, the lower portion 1 may be attached to the upper portion by bonding or bolting the two together, rather than by utilising one of the fastening means specified. Nor is it essential to make the upper portion 3 from a lighter material than that used for the lower portion 1.

Further, one would not be departing from the scope of the invention by moulding each segment of the lower portion 1 in one piece rather than by bonding the inner and outer walls 7 and 8 to the diaphragms 6 as described.

The lap joints between adjacent segments of the lower portion 1 may take any convenient form such as bonding or bolting.

The shape of the flexible jet nozzle orifice may be of any form depending upon the design of the vehicle, and thus the invention facilitates the provision of different nozzle forms at various stations around the periphery of the vehicle and even any stabilising keels or stability slots which may also be provided with flexible extensions. The hard-wearing hem 11 may be formed by turning the lower edge of each wall 7 or 8 back upon itself to form a double thickness, rather than by attaching a separate bead as previously described, and it may be manufactured from any suitable material other than polyurethane rubber.

It will be further apparent to those skilled in the art that the application of this invention is not limited to funnel-shaped flexible skirting assemblies, and that it may equally be applied to simple skirting arrangements.

We claim as our invention:

1. A ground effect vehicle including a flexible skirt assembly to retard the escape of the gaseous ground effect cushion, the flexible skirt assembly having an upper portion and a lower portion, both the upper and lower portions comprising inner and outer flexible walls, the lower portion comprising a plurality of segments, the segments of the lower portion being releasably connected to the upper portion, the segments of the lower portion having overlapping ends, and means for securing said overlapping ends together.

2. A ground effect vehicle according to claim 1 wherein the lower portion of the flexible skirt assembly has a reinforced lower edge to resist abrasion and the like.

3. A ground effect vehicle according to claim 1 wherein the lower portion of the flexible skirt assembly is formed of a heavier material than the upper portion.

4. A ground effect vehicle according to claim 1 and further including diaphragms extending between the inner and outer walls of the lower portion.

5. A ground effect vehicle according to claim 1 wherein said means for securing together the overlapping ends of the segments of the lower portion comprises bolts.

6. A ground effect vehicle comprising a flexible skirt assembly, said flexible skirt assembly an upper portion of a relatively light flexible material, a lower portion of a relatively heavy flexible material releasably secured to the upper portion, the upper and lower portions having inner and outer walls, the lower portion formed of segments, each segment having the end portions thereof extending into overlapping relation with the adjacent segments, means to secure said overlapping end portions together, diaphragms extending between the inner and outer walls of the lower portions, and means reinforcing the lower edges of the segments.

References Cited by the Examiner

UNITED STATES PATENTS 2,988,380  6/1961  Puckett et al. _____ 280—150

FOREIGN PATENTS 1,319,033  1/1963  France.
1,319,034  1/1963  France.

BENJAMIN HERSH, *Primary Examiner.*

A. HARRY LEVY, *Examiner.*

M. S. SALES, *Assistant Examiner.*